United States Patent [19]

Norteman, Jr.

[11] 4,175,052
[45] Nov. 20, 1979

[54] ALKALINE-MNO₂ CELL HAVING A ZINC POWDER-GEL ANODE CONTAINING P-N-V-P OR PMA

[75] Inventor: William E. Norteman, Jr., Elyria, Ohio

[73] Assignee: Union Carbide Corporation, New York, N.Y.

[21] Appl. No.: 892,311

[22] Filed: Mar. 31, 1978

[51] Int. Cl.² .................... H01M 4/62; H01M 4/24; H01M 4/38
[52] U.S. Cl. .................... 252/182.1; 252/510; 252/512; 252/518; 429/206; 429/212; 429/229
[58] Field of Search ............ 252/182.1, 510, 512, 252/518; 429/206, 212, 229

[56] References Cited

U.S. PATENT DOCUMENTS

| | | |
|---|---|---|
| 3,502,505 | 3/1970 | Jackson et al. ............... 252/182.1 |
| 3,871,918 | 3/1975 | Viescou ........................ 429/212 |
| 3,884,721 | 5/1975 | Tucholski .................... 429/212 |
| 3,918,989 | 11/1975 | Gillman et al. ............... 429/212 |
| 3,954,506 | 5/1976 | Sullivan ....................... 429/212 |

*Primary Examiner*—Richard E. Schafer
*Assistant Examiner*—Irwin Gluck
*Attorney, Agent, or Firm*—Cornelius F. O'Brien

[57] ABSTRACT

An alkaline-MnO₂ cell employing a zinc powder-gel anode in which the gelling agent is poly-N-vinyl pyrrolidone (P-N-V-P) or polymethacrylic acid (PMA) with or without carboxymethyl cellulose.

21 Claims, No Drawings

ALKALINE-MNO₂ CELL HAVING A ZINC POWDER-GEL ANODE CONTAINING P-N-V-P OR PMA

FIELD OF THE INVENTION

The invention relates to zinc powder-gel anodes for alkaline-$MnO_2$ cells and specifically to such anodes wherein the gelling agent is poly-N-vinyl pyrrolidone (P-N-V-P) and/or polymethacrylic acid (PMA) with or without carboxymethyl cellulose (CMC).

BACKGROUND OF THE INVENTION

A conventional type of alkaline cell employs a cathode comprising predominantly an oxidic depolarizer such as manganese dioxide usually admixed with a binder and conductive material such as graphite, steel wool and the like. The anode usually comprises a consumable anodic material such as powder zinc admixed with a gelling agent such as carboxymethyl cellulose, a suitable alkaline electrolyte such as an aqueous potassium hydroxide solution, and if desired, mercury. The gel anode is then extruded to form a desired shaped electrode. Anode materials and their preparation are described in U.S. Pat. Nos. 2,938,064 and 2,935,547 issued to K. Kordesch and U.S. Pat. No. 2,993,947 issued to E. E. Leger. The above electrodes together with conventional separator material can be assembled into an alkaline-$MnO_2$/zinc cell.

Discharging the above described cell on a microampere drain or on very intermittent discharge has resulted in zinc oxide formation in the separator which can result in internal shorts. Specifically, zinc oxide in contact with metallic zinc is known to be conductive and thus an internal electronic path is formed between the anode and cathode. An investigation of the internal shorting problem has revealed the carboxymethyl cellulose to be a major contributor to the transporting and precipitating of the zinc oxide throughout the cell. This internal shorting causes wasteful consumption of the components of the cell resulting in lower output capacity.

It is an object of the present invention to provide an alkaline-$MnO_2$ cell that can be discharged on microampere drains without internally shorting.

It is another object of the present invention to provide a powder-gel anode for alkaline-$MnO_2$ cells that employs P-N-V-P and/or PMA with or without carboxymethyl cellulose as the gelling agent.

It is another object of the present invention to provide a powder-gel anode comprising powder zinc, poly-N-vinyl pyrrolidone and/or polymethacrylic acid with or without carboxymethyl cellulose and an aqueous alkaline electrolyte.

It is another object of the present invention to employ poly-N-vinyl pyrrolidone and/or polymethacrylic acid as a gelling agent and lubricating agent for powder-gel anodes.

The foregoing and additional objects will become more fully apparent from the following description.

SUMMARY OF THE INVENTION

The invention broadly relates to powder-gel anodes comprising a major portion of a consumable anodic material such as zinc, a minor amount of a gelling agent such as poly-N-vinyl pyrrolidone and/or polymethacrylic acid with or without carboxymethyl cellulose and an aqueous alkaline electrolyte such as an aqueous potassium hydroxide solution.

The powder-gel anode of this invention is ideally suited for alkaline-$MnO_2$ cells. The total amount of the gelling agent(s), poly-N-vinyl pyrrolidone and/or polymethacrylic acid, should range between about 0.5 and about 6 percent based on the total weight of the extruded anode prior to its assembly into a cell. An amount lower than 0.5 percent would not provide sufficient binding for the anode while an amount above 6 percent would replace too much of the active anode material for a given size anode without providing any additional advantage. Preferably the amount of P-N-V-P and the PMA should range between about 2 percent and about 4 percent based on the total weight of the extruded anode.

Poly-N-vinyl pyrrolidone and polymethacrylic acid have been found to have no ionic charge and therefore will not form complexes with metallic salts. Contrary to this, carboxymethyl cellulose, a carboxylic acid, does have an ionic charge and further can be oxidized by the action of manganese dioxide to produce more carboxylic acid groups. It is believed that if a complex between carboxymethyl cellulose and zinc oxide is formed, it must have an association constant such that a minimum amount of carboxymethyl cellulose and zinc oxide must be in solution so that the product of their concentration exceeds that of the association constant before the solid complex will precipitate. Consequently by reducing the potassium hydroxide concentration, the solubility of zinc oxide is reduced thereby reducing the ionic product to a value close to or below the association constant which can prevent the carboxymethyl cellulose complex from transporting and precipitating the zinc oxide throughout the cell. The same effect is believed true if the carboxymethyl cellulose concentration is reduced. Thus by reducing either the zinc oxide or carboxymethyl cellulose in solution, the complex of these two compounds can be reduced thus resulting in less zinc oxide transported throughout the cell.

One advantage in the use of carboxymethyl cellulose is that it will cause the anode to swell on contact with the cell electrolyte thereby providing a good anode-to-cathode interface for optimum cell service. In an extruded anode containing P-N-V-P, P-N-V-P was observed to quickly precipitate on contact with cell electrolyte without allowing the anode to effectively swell. Although the anode can be appropriately formed and positioned to make good contact against the separator/cathode of the cell before the electrolyte is added, it is within the scope of this invention to use a reduced amount of carboxymethyl cellulose along with P-N-V-P in the formation of powder-gel anodes. Thus the advantage of the swelling characteristics obtained through the use of carboxymethyl cellulose can be utilized without the disadvantage of internal shorting since the amount of carboxymethyl cellulose to be used can be greatly reduced from the amount that would normally be employed. For example, normally carboxymethyl cellulose is employed in an amount of about 3.5 to 5 percent based on the weight of the anode while the amount which can be used along with P-N-V-P in accordance with this invention is only about 0.5 to 2.5 percent based on the weight of the anode.

In addition to being a good substitute for carboxymethyl cellulose in powder-gel anodes, P-N-V-P upon precipitating will release or free electrolyte to the cell where it can be used in the electrochemical reaction and/or to improve ionic diffusion in the cell. P-N-V-P has proved to have better lubricating properties than carboxymethyl cellulose thereby allowing the removal of some of the total organics needed for extrusion or binding of the cell anode.

Polymethacrylic acid is soluble in potassium hydroxide solutions and absorbs a large amount of potassium hydroxide in comparison to its weight, thereby possessing good swelling characteristics. Consequently polymethacrylic acid has been found to be a good substitute for some or all of the carboxymethyl cellulose in powder-gal anodes thereby effectively eliminating internal shorts in cells using the anode on microampere drain conditions.

Preferably the P-N-V-P and/or PMA can vary between about 1 and about 4.5 percent and the carboxymethyl cellulose can vary between about 0.5 and about 2.5 percent based on the weight of the anode. Most preferably, the P-N-V-P should be about 1 percent, or the PMA should be about 1.7 percent, and the carboxymethyl cellulose about 1.5 percent based on the weight of the anode. Preferably the total amount of the gelling agents should be between about 2.5 percent and 4 percent based on the weight of the anode.

EXAMPLE 1

Two test lots of alkaline-MnO$_2$ cells (0.6 ampere-hour capacity) were constructed using electrodes formed from the following mixes:
cathode:
  1.69 g. manganese dioxide
  0.16 g. graphite
  0.03 g. acetylene black
  0.23 g. KOH (37%)
anode:
  0.74 g. powdered zinc (about 60 Tyler Mesh size)
  0.097 g. 0.1 N KOH
  0.044 g. Mercury
  a gelling agent as shown in Table 1.

The above components, along with a fibrous cellulosic separator, were assembled in a conductive housing and cells from the two test lots were stored at 54° C. or 71° C. for various time periods and then the open circuit voltage and current were observed. The data so obtained are shown in Table 1.

As evident from the data shown in Table 1 P-N-V-P can effectively be used as a substitute for carboxymethyl cellulose without adversely affecting the open circuit voltage of the cell.

TABLE I

| | Storage 71° C. | | | | Storage 54° C. | | | |
|---|---|---|---|---|---|---|---|---|
| | Test Lot 1 | | Test Lot 2 | | Test Lot 1 | | Test Lot 2 | |
| Time | VOLTS* | AMPS | VOLTS* | AMPS | VOLTS* | AMPS | VOLTS* | AMPS |
| Fresh | 1.59 | 5.3 | 1.59 | 5.3 | 1.59 | 5.3 | 1.59 | 5.2 |
| 1 week | 1.54 | 4.7 | 1.56 | 4.5 | | | | |
| 2 weeks | 1.51 | 3.9 | 1.54 | 3.9 | 1.54 | 4.5 | | |
| 3 weeks | 1.50 | 3.8 | 1.51 | 3.4 | 1.56 | 4.7 | | |

Test Lot 1 = 0.032g carboxymethyl cellulose
Test Lot 2 = 0.014g carboxymethyl cellulose + 0.009g P-N-V-P (obtained from GAF Corp. and having a grade designation of K-90)
amps = amperes
*open circuit voltage (volts)

EXAMPLE 2

Two test lots of cells (0.6 ampere-hour capacity) were produced as in Example 1 except that the gelling agent employed in each is as shown in Table 2. Cells from the two test lots were stored at 54° C. or 71° C. for various periods and the open circuit voltage and current were observed. The data so obtained are shown in Table 2.

As evident from the data shown in Table 2, the PMA can effectively be used as a substitute for carboxymethyl cellulose without adversely affecting the open circuit voltages of the cells.

TABLE II

| | Storage 71° C. | | | | Storage 54° C. | | | |
|---|---|---|---|---|---|---|---|---|
| | Test Lot 1 | | Test Lot 2 | | Test Lot 1 | | Test Lot 2 | |
| Time | *Volts | Amps | *Volts | Amps | *Volts | Amps | *Volts | Amps |
| Fresh | 1.58 | 4.7 | 1.58 | 3.1 | 1.58 | 4.6 | 1.58 | 2.3 |
| 1 week | 1.53 | 3.3 | 1.53 | 2.2 | | | | |
| 2 weeks | 1.49 | 3.0 | 1.52 | 1.8 | 1.52 | 4.0 | 1.54 | 1.8 |
| 3 weeks | 1.48 | 3.0 | 1.51 | 1.5 | | | | |
| 4 weeks | 1.47 | 2.5 | 1.50 | 1.7 | 1.51 | 3.7 | 1.53 | 1.8 |
| 5 weeks | 1.45 | 2.3 | 1.49 | 1.5 | | | | |
| 6 weeks | 1.44 | 2.2 | 1.48 | 1.3 | 1.50 | 3.4 | 1.52 | 1.4 |
| 7 weeks | 1.43 | 2.0 | 1.48 | 1.3 | | | | |
| 8 weeks | 1.43 | 1.8 | 1.47 | 1.2 | 1.49 | 3.1 | 1.51 | 1.2 |
| 10 weeks | | | | | 1.49 | 2.9 | 1.51 | 1.2 |
| 12 weeks | | | | | 1.48 | 2.8 | 1.50 | 1.0 |

Test Lot 1 = 0.032g CMC
Test Lot 2 = 0.0086g CMC + 0.015g PMA
*Open circuit voltage (volts)
amps = amperes

EXAMPLE 3

Two test lots of cells (0.6 ampere-hour capacity) were produced as in Example 1 except that the gelling agent employed in each is as shown in Table 3. Cells from the two test lots were discharged across various loads and the times observed to reach different cutoff voltage levels were noted. The data so obtained are shown in Table 3.

As evident from the data shown in Table 3, PMA can effectively be used as a substitute for carboxymethyl cellulose without adversely affecting the performance or service life of the cells.

Table III

| Resistor Load (ohms) | 1.0 VOLT CUTOFF Test Lot No. | | 0.9 VOLT CUTOFF Test Lot No. | | 0.7 VOLT CUTOFF Test Lot No. | |
|---|---|---|---|---|---|---|
| | 1 | 2 | 1 | 2 | 1 | 2 |
| 25[1] | 6.6 | 6.3 | 7.4 | 7.2 | 9.0 | 9.1 |
| 25[2] | 6.5 | 6.9 | 7.6 | 7.8 | 8.8 | 9.0 |
| 83⅓[3] | 24 | 25 | 27 | 28 | 33 | 42 |
| 125[4] | 36 | 37 | 40 | 42 | 48 | 49 |
| 125[3] | 37 | 37 | 40 | 43 | 48 | 50 |

[1] = continuous discharge
[2] = discharge ½ hour a day
[3] = discharge 4 hours a day
[4] = discharge 2 hours a day
Test Lot No. 1 = 0.032g CMC
Test Lot No. 2 = 0.0086g CMC + 0.015g PMA

EXAMPLE 4

Two cells (0.6 ampere hour capacity) were produced in accordance with Example 1 except that one cell employed 3.5 percent carboxymethyl cellulose as the gelling agent and the other cell employed 1.7 percent polymethacrylic acid and 1.0 percent carboxymethyl cellulose as the gelling agents. The cells were continually discharged across a 1500-ohm load and after 350 hours the cell containing the carboxymethyl cellulose gelling agent internally shorted while the cell containing the polymethacrylic acid and carboxymethyl cellulose gelling agents continued for 750 hours without internally shorting out.

EXAMPLE 5

Two cells (0.6 ampere hour capacity) were produced in accordance with Example 1 except that one cell employed 3.5 percent carboxymethyl cellulose as the gelling agent and the other cell employed 1.0 percent P-N-V-P and 1.5 percent carboxymethyl cellulose as the gelling agents. The cells were continually discharged across a 2670-ohm load and after about 288 hours the cell containing the carboxymethyl cellulose gelling agent internally shorted while the cell containing the P-N-V-P and carboxymethyl cellulose gelling agents continued for 865 hours without internally shorting out.

Numerous variations and modifications of the invention herein described can be made without departing from the spirit and scope thereof, and, accordingly, the same is not limited to its specific embodiments disclosed herein except as in the appended claims.

What is claimed:

1. A powder-gel anode comprising a major portion of a consumable anodic material, a minor amount of poly-N-vinyl pyrrolidone and an aqueous alkaline electrolyte solution.

2. The powder-gel anode of claim 1 wherein the consumable anodic material is zinc powder and the electrolyte solution is aqueous potassium hydroxide.

3. The powder-gel anode of claim 2 wherein the poly-N-vinyl pyrrolidone is present in an amount between about 0.5 and 6 percent based on the weight of the anode.

4. The powder-gel anode of claim 1 wherein the powder-gel anode contains a minor amount of carboxymethyl cellulose.

5. The powder-gel anode of claim 4 wherein the poly-N-vinyl pyrrolidone varies between about 1 and about 4.5 percent and the carboxymethyl cellulose between about 0.5 and about 2.5 percent based on the weight of the anode.

6. The powder-gel anode of claim 5 wherein the poly-N-vinyl pyrrolidone is about 1 percent and the carboxymethyl cellulose is about 1.5 percent based on the weight of the anode.

7. The powder-gel anode of claim 4 wherein the consumable anodic material is zinc powder and the electrolyte solution is aqueous potassium hydroxide.

8. The powder-gel anode of claim 1 for use in an alkaline-$MnO_2$ cell employing an aqueous potassium hydroxide electrolyte.

9. The powder-gel anode of claim 4 for use in an alkaline-$MnO_2$ cell employing an aqueous potassium hydroxide electrolyte.

10. A powder-gel anode comprising a major portion of a consumable anodic material, a minor amount of polymethacrylic acid and an aqueous alkaline electrolyte solution.

11. The powder-gel anode of claim 10 wherein the consumable anodic material is zinc powder and the electrolyte solution is aqueous potassium hydroxide.

12. The powder-gel anode of claim 11 wherein the polymethacrylic acid is present in an amount between about 0.5 and about 6 percent based on the weight of the anode.

13. The powder-gel anode of the claim 10 wherein the powder-gel anode contains a minor amount of carboxymethyl cellulose.

14. The powder-gel anode of claim 13 wherein the polymethacrylic acid varies between about 1 and about 4.5 percent and the carboxymethyl cellulose between about 0.5 and about 2.5 percent based on the weight of the anode.

15. The powder-gel anode of claim 14 wherein the polymethacrylic acid is about 1.7 percent and the carboxymethyl cellulose is about 1.5 percent based on the weight of the anode.

16. The powder-gel anode of claim 13 wherein the consumable anodic material is zinc powder and the electrolyte solution is aqueous potassium hydroxide.

17. The powder-gel anode of claim 10 for use in an alkaline-$MnO_2$ cell employing an aqueous potassium hydroxide electrolyte.

18. The powder-gel anode of claim 13 for use in an alkaline-$MnO_2$ cell employing an aqueous potassium hydroxide electrolyte.

19. The powder-gel anode of claim 10 wherein the powder-gel anode contains a minor amount of poly-N-vinyl pyrrolidone.

20. The powder-gel anode of claim 13 wherein the powder-gel anode contains a minor amount of poly-N-vinyl pyrrolidone.

21. The powder-gel anode of claim 20 wherein the polymethacrylic acid and poly-N-vinyl pyrrolidone are present in an amount between about 1 and about 4.5 percent based on the weight of the anode and the carboxymethyl cellulose is present in an amount between about 0.5 and about 2.5 percent based on the weight of the anode.

* * * * *